US00RE35678E

United States Patent [19]

Robinson

[11] E Patent Number: Re. 35,678

[45] Reissued Date of Patent: Dec. 2, 1997

[54] SIGNAL-RESISTANT CARD DECK AND DEVICE

[76] Inventor: Gary A. Robinson, One Maloyan La., Lafayette, Calif. 95549

[21] Appl. No.: 549,100

[22] Filed: Oct. 27, 1995

Related U.S. Patent Documents

Reissue of:

[64] Patent No.: 5,257,788
Issued: Nov. 2, 1993
Appl. No.: 827,567
Filed: Jan. 28, 1992

U.S. Applications:

[63] Continuation of Ser. No. 422,004, Oct. 16, 1989, abandoned.

[51] Int. Cl.[6] ..... A63F 1/00

[52] U.S. Cl. ..... 273/303; 273/307

[58] Field of Search ..... 273/303, 304, 273/305, 306, 307, 292; D21/42, 43, 44, 45, 46, 47

[56] References Cited

U.S. PATENT DOCUMENTS

| | | | |
|---|---|---|---|
| D. 44,430 | 7/1913 | Wilson | D21/45 |
| D. 54,216 | 11/1919 | Loring | D21/44 |
| D. 54,217 | 11/1919 | Loring | D21/44 |
| D. 81,336 | 6/1930 | Joseph | D21/45 |
| D. 86,131 | 2/1932 | Logan | D21/45 |
| D. 90,427 | 8/1933 | Steidley | D21/46 |
| D. 155,268 | 9/1949 | Brzeski | D21/45 |
| D. 161,293 | 12/1950 | Simoes | D21/45 |
| D. 181,884 | 1/1958 | Stauff | D21/45 |
| 1,255,003 | 1/1918 | Gettemy | 273/304 |
| 1,293,183 | 2/1919 | Peckman | 273/303 |
| 1,584,180 | 5/1926 | Martin | 273/304 X |
| 2,560,187 | 7/1951 | Post | 273/303 X |

FOREIGN PATENT DOCUMENTS

| | | | |
|---|---|---|---|
| 700270 | 11/1953 | United Kingdom | 273/303 |

*Primary Examiner*—Sebastiano Passaniti
*Attorney, Agent, or Firm*—Sandra S. Schultz

[57] ABSTRACT

Disclosed is a deck of rectangular playing cards usually having two substantially parallel long edges and two substantially parallel short edges, substantially all cards in the deck having a front symmetrically designed with respect to both short edges, to minimize cheating by signalling with asymmetric cards. The front is usually designed to be symmetrical with respect to the short axis, and preferably the long axis as well, of each card. Generally, the deck includes at least 52 cards, thirteen in each of the four standard suits, spades, hearts, diamonds, and clubs. Frequently the symmetry is obtained by the use of at least one "double-pip" in the front of the card. A "double-pip" consists of a single pip of a suit having asymmetric pips, the pip placed generally end to end with its mirror image to create a single symmetric rather than asymmetric pip of the suit. Sometimes "reversed pips" are also used. A "reversed pip" is merely a pip placed upside-down on the front rather than right side up.

1 Claim, 3 Drawing Sheets

PRIOR ART

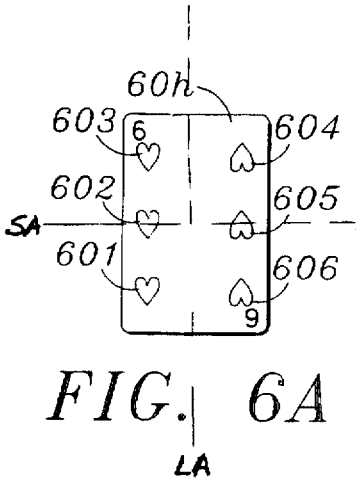
FIG. 6A
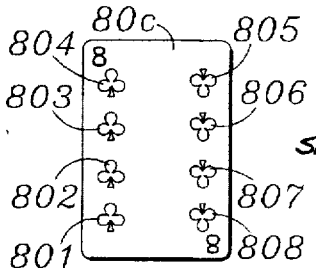
FIG. 6B
FIG. 7A
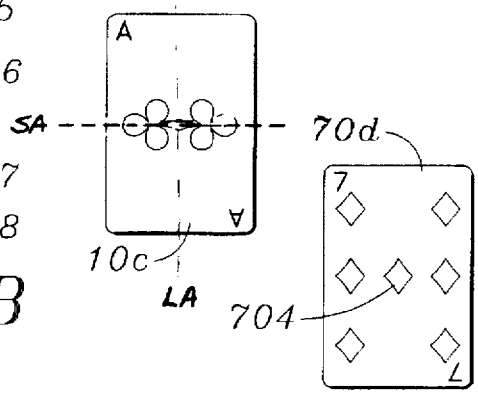
FIG. 7B
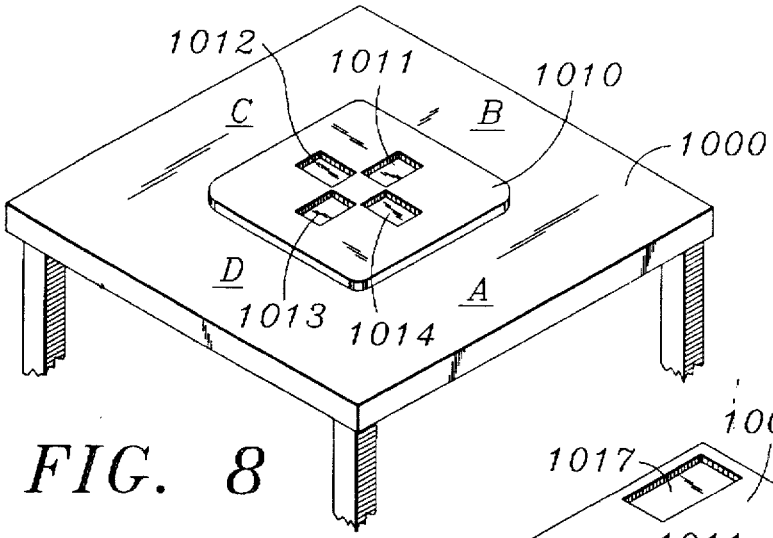
FIG. 8
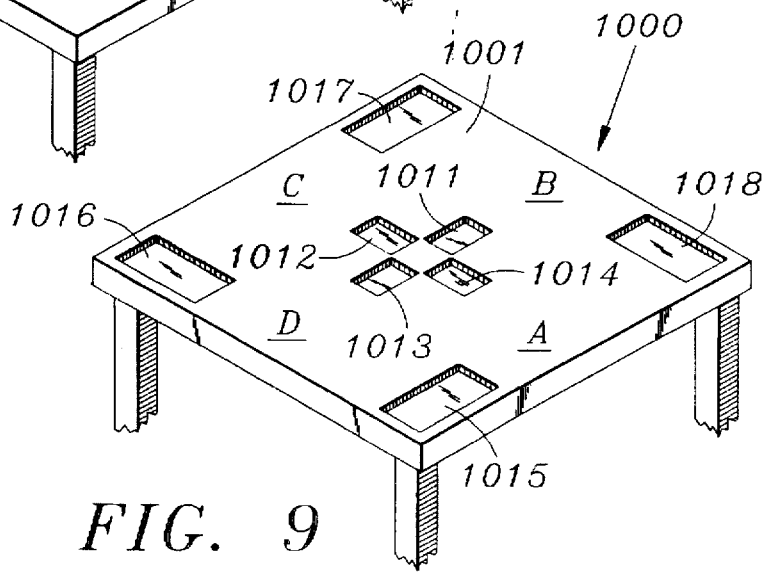
FIG. 9

SIGNAL-RESISTANT CARD DECK AND DEVICE

Matter enclosed in heavy brackets [ ] appears in the original patent but forms no part of this reissue specification; matter printed in italics indicates the additions made by reissue.

This is a continuation of application Ser. No. 07/422,004 filed Oct. 16, 1989 now abandoned.

BACKGROUND OF THE INVENTION

This invention relates to decks of playing cards and devices on which they can be played.

For many years, decks of playing cards have been used in the play of various card games. Specialized decks have been developed for numerous games, such as the children's deck commonly used for the play of "Old Maid."

New decks are occasionally developed for the play of particular games. For example, specialized rectangular decks are shown in U.S. Design Patent No. 260,156 to Persons, and 155,268 to Brzeski. A round deck is shown in U.S. Design Patent No. 81,336 to Joseph, and a one hundred four card deck in U.S. Design Patent 90,427 to Steidley.

A "standard deck" of cards today consists of a group of generally identically-sized rectangular cards. The back of each card usually contains a decorative design selected by the manufacturer which is usually identical for each card in the deck. The front or face of each card contains a design used for the play of the card game. As used hereafter the terms "standard deck" and "front" of a card will have the meaning set forth in this paragraph.

The most common card deck used today for the play of many card games contains fifty-two or more rectangular cards. There are thirteen in each of four suits—spades, hearts, diamonds, and clubs—and many decks contain jokers as well. The thirteen cards of each suit include ten numeric cards (Ace and two through ten) and three face cards (jack, queen and king).

The front or face of the cards of this currently-used common deck usually have what is by now a relatively standardized design for each card. The design is aligned to be read when the card has its longer axis vertical with respect to the reader: in the case of numeric cards, the face of the card contains the number of the card (or an "A" if the card is an ace) facing up in the upper left and down in the lower right corner together with a pip showing its suit. The card also contains a central design displaying the number of pips of the suit corresponding to the number represented by the card. The pips are displayed in a standard design for all suits and all cards in the spades and diamonds suits are shown in FIGS. 1 and 2, illustrating the particular alignment of the pips on the face of the cards of today's commonly-used deck.

If the card is a face card, it contains a J, Q, or K in the upper left facing up and in the lower right facing down together with a pip showing the suit, and a central design which is a representation of a Jack, Queen or King.

It should be noted from FIGS. 1 and 2 that the Ace, three, and five through nine of spades (as well as clubs and hearts) are asymmetrical about a horizontal axis dividing the card into two equal halves. In the case of the diamond suit, only the seven is asymmetrical.

Unfortunately, the above standard deck of cards allows cheating by improper signalling between partners, i.e. signalling based on the position or manner in which a given card is played. In contract bridge, in particular, signalling can legally and ethically be accomplished by the rank of the card played, but not by the manner and position in which the card is played. For example, if one bridge player plays an ace, his partner can legally signal by playing a high card in the same suit, which encourages the play of the same suit. A low card would instead (by legal signalling) discourage continued play of the same suit.

The play of assymmetric cards, however, in prearranged placement with respect to the partner to "override" the rank of the card, is not legal. For example, playing a high card facing in one direction to encourage playment of the same suit and in another direction to discourage it, is not legal, and in fact is a matter of concern in tournament bridge today, where tournament rankings are at stake. In fact, the rules of competitive bridge have been drawn so as to specifically preclude such improper signalling. For example, Law 73, Section A of the Laws of Duplicate Contract Bridge (American Edition) promulgated by the American Contract Bridge League provides that "communication between partners should be effected only by means of the calls and plays themselves." Further, "calls and plays should be made without special emphasis." Law 73, Section B2 provides "The gravest possible offense against propriety is for a partnership to exchange information through prearranged methods of communication other than those sanctioned by these Laws. The penalty imposed for infraction is normally expulsion from the sponsoring organization."

Obviously, the above-mentioned deck of standard cards allows such signalling to occur, or the need for such a rule would be eliminated. Among other things, the asymmetry of the cards mentioned allows cheating; for example, as shown in FIGS. 3A and 3B, the five of spades can be placed in either of two different alignments in order to give a signal to one's partner across the table. For more sophisticated signalling, even symmetrical cards can be angled to the left or the right as shown in FIGS. 3C and 3D.

Needless to say, it would be desireable to eliminate such cheating directly, by the design of the cards themselves or the play table, to preclude the problems of cheating that do occur, notwithstanding attempts to prevent it.

SUMMARY OF THE INVENTION

In one aspect, the invention includes a standard deck of rectangular playing cards having two substantially parallel long edges and two substantially parallel short edges, substantially all cards in the deck having a front symmetrically designed with respect to both short edges, to minimize cheating by signalling with asymmetric cards. In a further aspect, the front of substantially all cards is also symmetrically designed with respect to both long edges of the card.

Generally, the deck includes at least 52 cards, thirteen in each of the four suits (spades, hearts, diamonds, and clubs), the thirteen usually consisting of jack, queen, king, ace, two, three, four, five, six, seven, eight, nine, and ten.

Frequently the symmetry is obtained by the use of at least one "double-pip" in the front of the card. A "double-pip" (as used hereinafter) consists of a single pip (usually asymmetrical) of a given suit placed generally end to end with its mirror image to create a single symmetric rather than asymmetric pip of the suit. In the preferred embodiment of the deck of playing cards of the present invention, at least one pip on each ace, three, five, seven of spades, dubs, and hearts, and nine is a double-pip.

In some embodiments, "reversed pips" are used more extensively than in the current deck. A "reversed pip" as used hereafter is merely a pip placed upside-down rather than right side up.

In another aspect, the invention includes a standard deck of rectangular cards having a short and a long axis, substantially all cards designed to be symmetrical about the short axis. Preferably, they are also symmetric about the long axis.

In another aspect, the invention includes apparatus to minimize signalling by aligning cards on the playing surface in an angled fashion with respect to the party being signalled. It comprises apparatus for the play of cards having a surface with guides thereon for receiving a card so that cards played must be aligned with respect to the guides to minimize signalling by the players.

Frequently, the apparatus is a tray or the table itself and the he guides are indentations in the surface. In the preferred embodiment, a substantially square tray, it includes four indentations, each the shape of a rectangular playing card, the indentations generally aligned with respect to each other to form the legs of a cross and also generally located closer to the center of the rectangle than the edges.

BRIEF DESCRIPTION OF THE DRAWINGS

As discussed above.

FIGS. 6A and 6B illustrate alternate embodiments of the symmetrical six and eight of the present invention, showing cards of the heart and club suit this time.

FIG. 7A illustrates a symmetric card (an ace) of the present invention in the club suit.

FIG. 7B illustrates a seven of diamonds rendered symmetric in accordance with the present invention. The seven of diamonds is the only asymmetric diamond in the standard deck.

FIG. 8 is a three-quarter elevation of a tray of the present invention used to eliminate signalling.

FIG. 9 is a three-quarter elevation of a table of the present invention used to eliminate signalling.

DETAILED DESCRIPTION OF THE SPECIFIC EMBODIMENTS

Turning again to FIGS. 1 and 2, the standard prior art deck of cards used in playing bridge and other standard card games contains fifty-two cards, plus jokers. The back of the cards in a deck contain a distinctive standard design, so that one deck can be distinguished from the other. The fifty-two cards contain thirteen in each suit.

Figure 1:
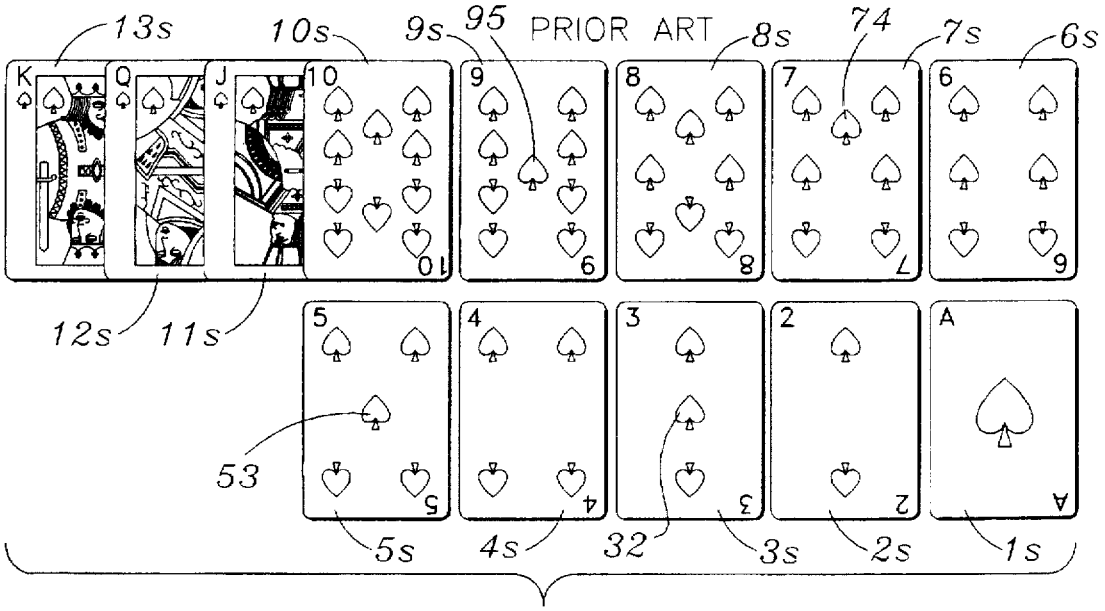
FIG. 1 is a top view of the spades suit of the prior art standard deck of-cards.
Figure 2:
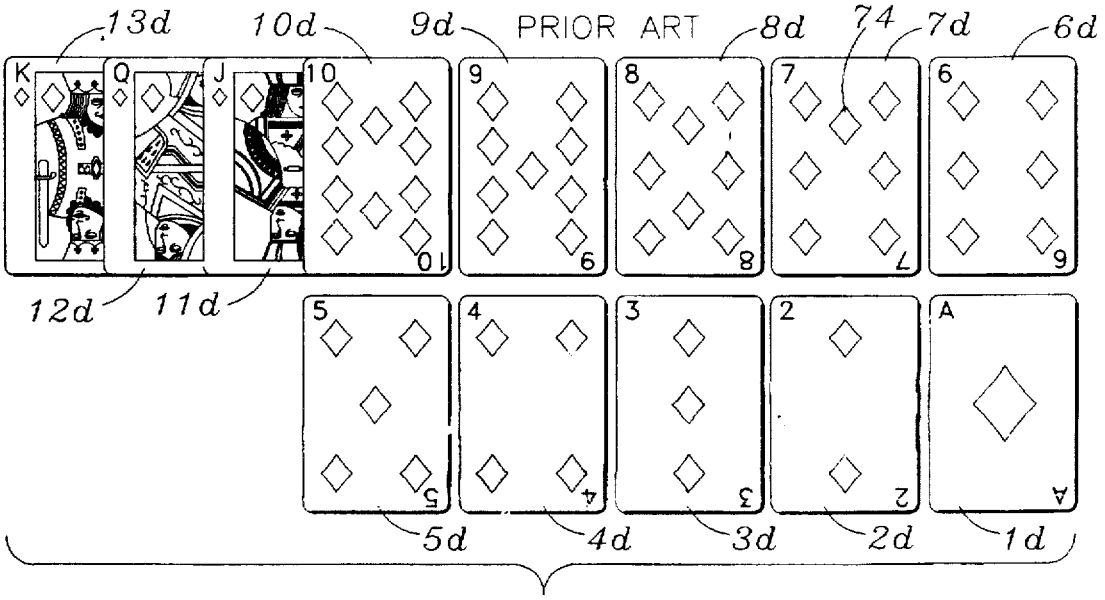
FIG. 2 is a top view of the entire diamond suit of the prior art standard deck of cards.

The thirteen cards of the spade suit can be seen in FIG. 1 while the thirteen cards of the diamond suit can be seen in FIG. 2. As is evident from the figures, each suit contains an ace, (labelled 1s, and 1d in the spade and diamond suits respectively), a two through a ten, (labelled 2s through 10s in the spade suit, and 2s through 10d in the diamond suit), and three face cards, a jack (labelled 11s or 11d), a queen (labelled 12s or 12d) and a king (labelled 13s or 13d). In the case of the spade suit, the two, four, and ten, jack, queen, king are symmetrical with respect to each short edge, and, as a matter of fact, with respect to both long edges as well. The remaining cards of the spade suit (Ace, three, five, six, seven, eight, and nine labelled respectively 1s, 3s, 5s, and 6s through 9s) are asymmetric with respect to at least the short edge. This is due to asymmetrically located pips such as pip 74 which is closer to one short edge than another of the seven of spades 7s, or reverse pips such as 51 and 55 which do not directly correspond in number and alignment with non-reversed pips such as 52, 53, and 54.

Because the diamond pip is symmetrical, in contrast to the asymmetrical spade pip, the entire diamond suit of the standard prior art deck which is shown in FIG. 2, only card 7d, the seven, is asymmetric, due to the one central pip 74 disposed closer to one short edge than another.

The remaining suits, hearts and clubs (the pips of these suits are shown on the cards of FIGS. 6A and 6B respectively), have pips which are asymmetric as is the spade pip. Therefore, the heart and spade suits of the prior art deck, although not shown, contain the same asymmetric cards as the spade suit.

Figure 3A:
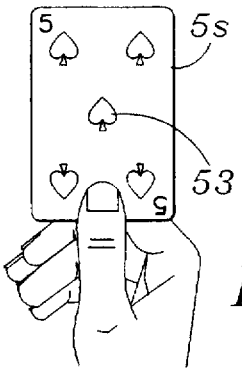
FIG. 3A PRIOR ART
FIGS. 3A, 3B, 3C and 3D are top views of the five of spades in play and of the two of spades in play, illustrating possible signalling with the current deck of cards.
Figure 3B:
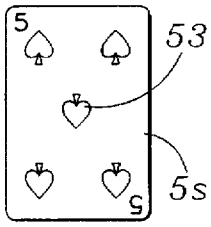
FIG. 3B PRIOR ART
Figure 3C:
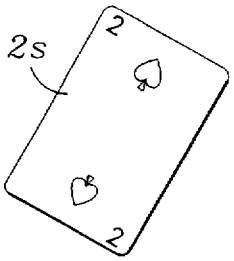
FIG. 3C PRIOR ART
Figure 3D:
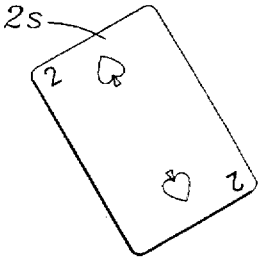

Turning now to FIGS. 3A and 3B, signalling with the prior art deck is shown. By playing an asymmetric card such as five of spades 5s aligned in one direction with center pip 53 upright as in FIG. 3A rather than reversed as in FIG. 3B, signalling the partner can be accomplished. Even a symmetric card such as the two of spades 2s can be used to signal, by angling the card one way or the other (as shown in FIGS. 3C and 3D) with respect to one's partner across the table. Obviously, this creates great potential and great temptation for cheating, particularly in high stakes partnership games such as tournament bridge.

The present invention eliminates this problem, utilizing a completely symmetric deck of cards, to avoid signalling with asymmetric cards. In the preferred embodiments, major changes in the-card deck, however, are minimized as much as possible in order to avoid player resistance to adoption of the deck of cards of the present invention.

Figure 4:
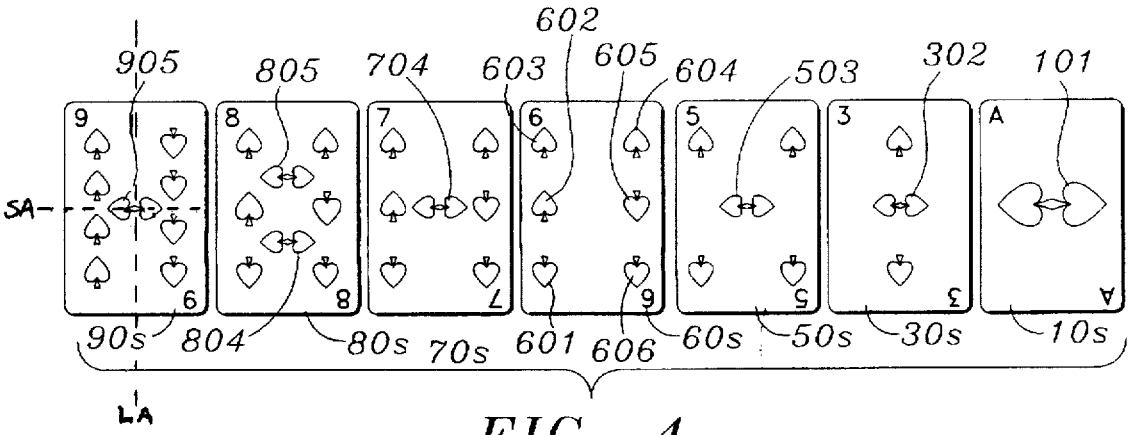
FIG. 4 is an illustration of an embodiment of the cards of the present invention, in particular the spades which are asymmetric in the standard current deck.
Figure 5A:
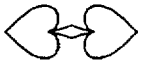
FIGS. 5A through 5D are enlarged details of a "double-pip" of each suit (spades, hearts, clubs, and diamonds, respectively) which is used in the present invention in the design of the front of some cards to avoid asymmetry.
Figure 5C:
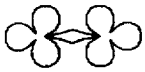
Figure 5B:
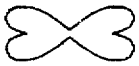

The Ace, three, and five through nine of spades of the present invention (these are the spades which are asymmetric in the prior art deck) are shown in FIG. 4 as cards 10s, 30s, and 50s through 90s. The center pips 11, 32, 53, 74, and 95, and preferably 84 and 85 (and even 105 and 106). have now been rendered symmetric by the use of a symmetric double-pip instead. An enlarged view of the spade double-pip is shown in detail in FIG. 5A; it is used in the present invention to render the asymmetric cards symmetric and appears as pip 104, 302, 503, 704, 804 and 805, and 905. The double pip is symmetric with respect to both short edges of the card and, with respect to both long edges, to create a symmetric card. It is also symmetrical about the short axis and the long axis of the card. Double pips for the heart suit are shown in FIG. 5B and for the club suit in FIG. 5C, and are placed on the card in a fashion identical to that shown in FIG. 4 for spades, in the preferred embodiment.

Figure 5D:
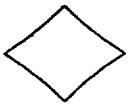

FIG. 5D shows the diamond double-pip; however, as is evident, the diamond pip is already symmetrical, so no changes need to be made to render it symmetrical. In the diamond suit of the preferred embodiment of the present invention, the only card which differs from the standard card is the seven of diamonds 70d shown in FIG. 7B. In the standard deck, seven of diamonds 7d has an asymmetrically placed central pip 74; in the present invention, central pip 704 is placed symmetrically with respect to both short edges of the card, as shown in FIG. 7B.

Also, in order to create a symmetric deck, reverse pips are used more frequently than in the standard deck. An examination of the asymmetric cards of the standard deck shown in FIG. 1 reveals that the Ace 1s, the three 3s, the five 5s, and the nine 9s are rendered asymmetric only due to the presence of an asymmetric central pip; the present invention avoids this asymmetry by using a double pip instead. Similar asymmetry is resolved similarly in the case of the heart and club suits, but does not occur in the diamond suit of the standard prior art deck.

However, the six 6s, seven 7s, and eight 8s, plus the equivalent heart and club cards in the prior art deck are also asymmetric because three pips are aligned on each outer edge, two upright on each side, and one reversed. For example, in card 6s, pips 61 and 66, each at the bottom of the card, are reversed, while pips 62, 63, 64, and 65, are upright. In one embodiment of the present invention, as shown in FIG. 4, pip 601, 606, and 605 are reversed, while pips 602, 603, and 604 are upright. The same alignment is used for the eight 80s and the seven 70s, and obviously, a similar alignment of pips is used for the six, seven, and eight of hearts and spades.

An alternate approach to the alignment of the outer pips is shown in FIG. 6A, showing the six of hearts, 60h, where pips 601, 602, and 603 are upright, while 604, 605, and 604 are reversed. This design can be applied to both the seven and the eight of spades, hearts, and clubs, as well. In addition, the same general approach can be applied to the eight of hearts and spades as is shown on the eight of clubs 80c shown in FIG. 6B. In 80c, there are no central pips, and four pips are aligned in a row on each side of the card. As shown, 801 through 804 are upright, while 805 through 808 are reversed. Alternately, 801 can be reversed instead of upright and 805 upright instead of reversed, while the other pips remain as shown in 80c. Also, 801, 802, 807, and 808 can be reversed while the remaining pips are upright. In all these approaches, it is ideal, although not necessary, to keep the cards as similar to a standard deck as possible, with an eye to avoiding player resistance to adopting the deck.

For convenience, card 90s in FIG. 4, and FIGS. 6A and 7A illustrate the short SA and long LA axis of the card and the fact that the cards of the present invention have a face also symmetric about the short axis of each card and preferably also symmetric about the long axis as well.

Turning now to FIGS. 8 and 9, a device which is helpful in eliminating signalling, even with symmetric cards such as the above, is illustrated. A table 1000 around which the players sit at positions A, B, C, and D, is shown. At the center is placed a separate tray 1010 defining positions 1011, 1011, 1013, and 1014 for the play of the cards. For example, player A plays his cards in position closest to him, 1014, while player B lays his cards in position 1011 which is closest to him and his side of the table. As a result if the cards are symmetrical, and the player lays his cards in the position set forth, it is impossible for the player to signal by the lay of the cards in the fashion previously demonstrated in FIGS. 3A through 3D.

In the preferred embodiment, the positions 1011, 1012, 1013, and 1014 for the play of the cards define a generally cross-shaped area at the center of the tray, with each leg of the cross forming a position for the play of the cards. In the preferred embodiment, also, the tray, usually molded of plastic, defines actual indentations in which the cards are placed when they are played. In an alternate, simpler embodiment, a mere tablecloth can be marked with the appropriate positions (including the additional positions 1015 through 1018 shown in FIG. 9, if desired) and placed over the table for use instead.

FIG. 9 illustrates another embodiment of such a device, which, here, is actually incorporated in the table 1000. The table's upper surface 1001 itself defines positions for the play of the cards without signalling, in the preferred embodiment, positions 1011 through 1014 preferably forming a centrally-disposed cross-shape, each position aligned on one leg of the cross, and each player preferably using the position nearest his edge of the table. The positions are preferably formed as indentations in the surface of the table. In addition, indentations or other position markers are formed parallel with and near to the edge of the table, but not directly in front of the player, for the lay of tricks taken in the play of the game.

Naturally, it should be understood that the above discussion is intended by way of description and not by way of limitation, and that many other embodiments and approaches within the scope of the invention will be apparent to one of ordinary skill in the art.

What is claimed is:

1. A standard deck of rectangular playing cards, each card having two substantially parallel long edges and two substantially parallel short edges comprising:

face cards designated as jack, king and queen and number cards designated as ace, [one,] two, three, four, five, six, seven, eight, nine, and ten with said face cards and said number cards being arranged in suits designated as spades, hearts, diamonds and clubs; each of said number cards having a front bearing a central design having a number of pips corresponding exactly to the number and suit of the card, and on each number card that is designated as an ace, three, five, seven and nine of each of spades, clubs and hearts, there being at least one pip from said number of pips symmetrical with respect to both a line that is parallel to both short edges of the card and a line that is parallel to both long edges of the card; said at least one pip being arranged such that the central design appears identical to a player viewing the front of the card from either one of the short edges and from either one of the long edges of the card.

* * * * *